J. W. KROEZE.
SANDING MACHINE.
APPLICATION FILED JAN. 31, 1912.
1,030,473.
Patented June 25, 1912.
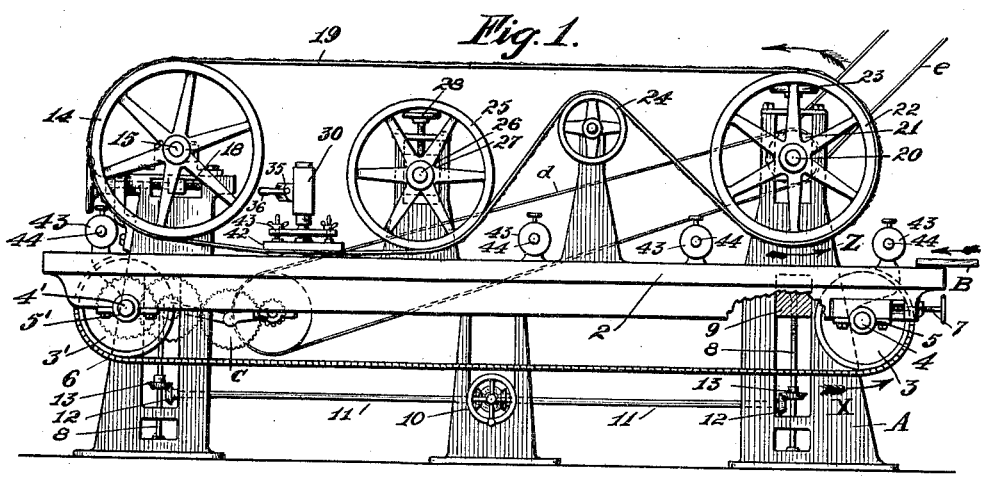
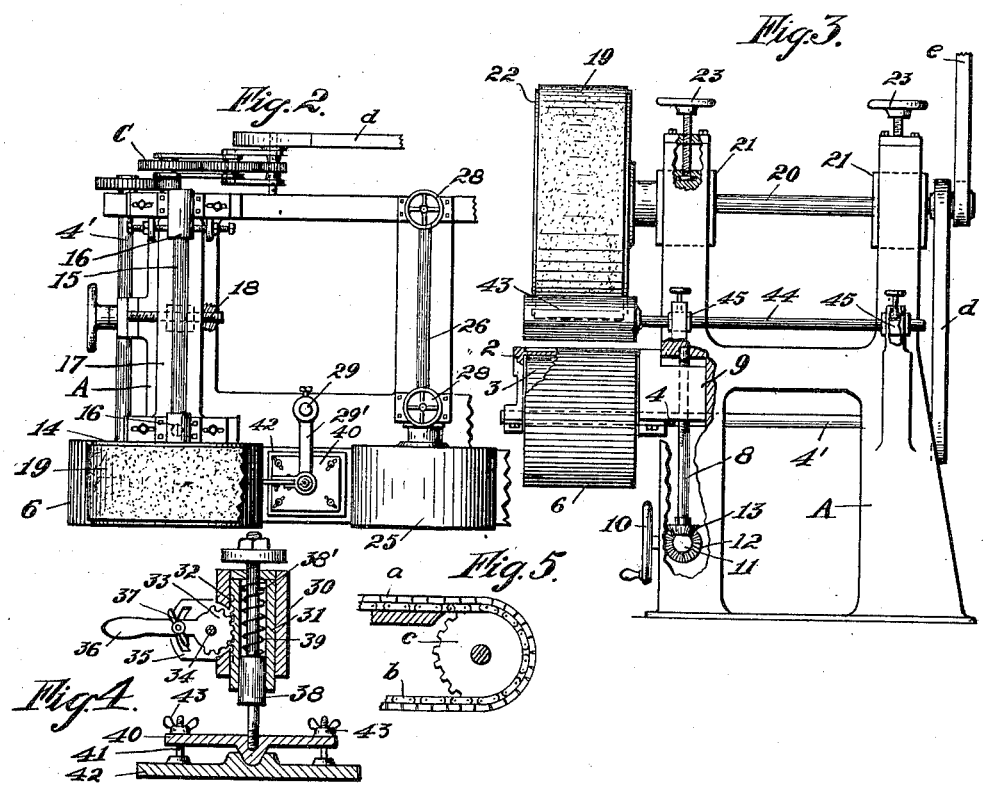
Witnesses:
R. S. Berry
Thos. Castberg
Inventor:
John W. Kroeze
By G. H. Strong
Atty.

UNITED STATES PATENT OFFICE.

JOHN W. KROEZE, OF BURLINGAME, CALIFORNIA.

SANDING-MACHINE.

1,030,473. Specification of Letters Patent. Patented June 25, 1912.

Application filed January 31, 1912. Serial No. 674,598.

*To all whom it may concern:*

Be it known that I, JOHN W. KROEZE, a citizen of the United States, residing at Burlingame, in the county of San Mateo and State of California, have invented new and useful Improvements in Sanding-Machines, of which the following is a specification.

This invention relates to a machine for sanding flat surfaces of lumber.

The particular object of this invention is to provide a machine for surfacing boards, planks and the like, to which the materials to be worked may be fed continuously.

Another object is to provide a sanding machine which is especially adapted to handling boards of considerable length and which is capable of adjustment to regulate the extent of the sanding action according to the requirements of the work being done.

A further object is to provide a sanding machine which is simple in construction and efficient in operation.

Other objects will appear hereinafter.

The invention consists of the parts and the construction and combination of parts as hereinafter more fully described and claimed, having reference to the accompanying drawings, in which—

Figure 1 is a side elevation of the invention with parts broken away. Fig. 2 is a partial plan view with parts removed. Fig. 3 is an end elevation with parts broken away. Fig. 4 is a detail in section of the belt-shoe shifting mechanism. Fig. 5 is a detail showing a modified form of the slatted belt construction.

In the drawings, A represents the frame of the machine which may be of any suitable construction, and mounted to be adjusted vertically on the frame A is a horizontally extending table 2, on the underside of which is mounted a pair of pulleys 3—3'. The pulleys 3—3' are mounted on shafts 4—4' journaled in bearings 5—5' disposed adjacent the ends of the table 2 and extending transverse thereof, and are designed to carry an endless slatted belt 6, the upper wing of which is supported on the table top, and travels in a recess or groove therein, which is of such depth as to position the upper surface of the belt substantially flush with the upper surface of the table.

If desired, the slatted belt 6 may be formed by mounting slats *a* on sprocket chains *b*, as shown in Fig. 5, in which event sprocket wheels *c* will be employed in lieu of the pulleys 3—3'. The belt 6 may be rotated in any suitable manner, a driving belt *d* operating on a pulley on the shaft 4 being here shown as provided for that purpose.

The bearings 5, in which the shaft 4 is mounted, are slidable on the table 2 and are adapted to be adjusted by means of a screw 7 to regulate the tension of the slatted belt.

The table 2 is adjusted vertically by means of screw-threaded shafts 8, which are mounted vertically on the frame A adjacent the ends of the table, and are threaded through lugs 9 formed on the table; the lugs 9 extending into vertical guide slots formed on the frame A.

Means are provided for rotating the threaded shafts 8 in unison to raise or lower the table 2 evenly, which means consists of a hand wheel 10 adapted to rotate a shaft 11, the outer ends of which carry beveled gears 12 meshing with beveled gears 13 on the shafts 8.

Mounted on the frame A adjacent one end of the table is a pulley wheel 14, which is adapted to be adjusted horizontally and is positioned above the slatted belt 6; the pulley 14 being mounted on a shaft 15 journaled in adjustable bearing blocks 16—16', which in turn are supported upon a movable frame 17 slidable in suitable bearings on the frame A. The frame 17 is adapted to be adjusted on the frame by means of a horizontally disposed screw 18 mounted in a threaded bearing on the frame A. The screw 18 is provided on its outer end with a hand wheel, by means of which it may be rotated to move the slidable frame 17 backward or forward, and thereby adjust the position of the pulley 14 to tension an abrasive belt 19 which passes thereover. The bearings 16—16' are adjustable on the frame 17 to permit of the shaft 15 being alined to adjust the pulley 14, so that the true travel of the belt 9 thereover will be insured.

Mounted on a drive shaft 20 journaled in vertically adjustable bearings 21 is a pulley wheel 22 which is disposed at the end of the frame A opposite that on which the pulley 14 is carried and is arranged over the slatted belt 6 in alinement with the pulley 14. The abrasive belt 19 passes around the pulley 22, as shown in Fig. 1. The bearings 21 are adjusted by means of hand screws 23 to throw the belt 19, passing under the pulley 22, in or out of contact with boards or slabs positioned on the slatted belt 2.

The shaft 20 is a drive shaft and may be rotated in any suitable manner to rotate the abrasive belt 19; a belt *e* operating on a pulley on the shaft 20 being here shown for that purpose. An idler pulley 24 is disposed between the pulleys 14 and 24, over which the abrasive belt 19 passes, as shown in Fig. 1; and positioned between the idler pulley 24 and the pulley 14 is a vertically adjustable idler pulley 25, under which the abrasive belt 19 passes. The pulley 25 is mounted on a shaft 26 journaled in blocks 27 which are capable of adjustment vertically by means of hand wheels 28; this adjustment of the blocks 27 being provided as a means for throwing that portion of the belt 19 passing under the pulley 25 in and out of contact with the surface of the material being worked.

Mounted on the upper end of a standard 29 on the frame A is a horizontally disposed arm or bracket 29′, the outer end of which terminates above the lower wing of the belt 19 midway between the pulleys 14—25, in a vertically disposed tubular member or bushing 30. Slidably mounted in the bushing 30 is a cylindrical casing 31, which has rack teeth 32 formed on its side adapted to be engaged by gear teeth on a segment 33. The segment 33 is pivoted at 34 on a bracket or lug 35 formed on the bushing 30 and has a lever handle 36 connected thereto, by means of which the segment may be rocked on its pivot 34 to adjust the position of the casing 31 in the bushing 30. A thumb screw 37 on the lever 36 extends through a slot on the bracket 35 and is provided for the purpose of clamping the segment in a fixed position, and thereby hold the casing 31 against movement. A plunger 38 is mounted in the casing 31, on which is secured a stem 38′ which extends upward through the top of the casing 31 and is guided therein. A spring 39 wound on the stem 38′, between the top of the plunger 38 and the end of the casing 31, normally retains the plunger in its lowermost position and at the same time forms a cushion against upward movement of the plunger 38.

A crosshead or bracket 40 is rigidly mounted on the lower end of the plunger 38, through which upwardly extending threaded studs 41 on a shoe 42 extend; wing nuts 43 being screwed on the upper ends of the studs to clamp the shoe 42 against a knot formed on the underside of the crosshead 40. The shoe 42 normally contacts the upper surface of the abrasive belt 19 when the casing 31 is in its intermediate position in the bushing 30, and is designed to be caused to bear on the belt at different degrees of pressure, or to be moved out of contact therewith, by the adjustment of the segment 33.

A series of idle rollers 43 mounted on shafts 44, journaled in vertically adjustable bearing blocks 45, are disposed at suitable intervals throughout the length of the table 2; the rollers 43 being positioned transverse of the table a short distance above the upper wing of the slatted belt 6. The idle rollers 43 act in conjunction with the belt 6 to form a feed mechanism for carrying the materials to be sanded under the lower wing of the abrasive belt 19.

In operation, the panel or board, indicated at B, to be sanded is fed endwise between the end roller 43 and the slatted belt 6 above the roller 3′, as shown in Fig. 1; the table 2 and the rollers 43 being adjusted in relation to each other to suit the thickness of the material to be worked. The slatted belt, on being rotated in the direction of the arrow X, Fig. 1, draws the board B lengthwise under the end roller 43 and carries it endwise throughout the length of the table 2 beneath the abrasive belt 19, which is rotated in the direction of the arrow Z, Fig. 1, opposite to the direction of travel of the board B.

The abrasive belt is thrown into contact with the upper surface of the board B by means of the pulleys 22—25 and the shoe 42; the pulleys 22—25 and the shoe 42 being lowered by their respective adjusting mechanisms to form three points of contact of the belt 19 on the board B.

It is obvious that either one or both of the pulleys 22—25 may be thrown out of their operative position, so as to subject the board B only to the action of the shoe 42, or the shoe 42 and one pulley 22 or 25, according to the degree or extent of the sanding operation on the board required. If desired, the shoe 42 may be thrown out of its operative position and either one or both of the pulleys 22—25 thrown in. By this arrangement any degree of sanding may be performed in one operation, as may be required by the nature of the finish desired. The particular advantage derived by this arrangement is in making deep cuts; the successive contacts of the bolt 19 enabling the surface of the board to be removed at a greater depth than would be possible with a single contact of the belt.

The purpose in providing a flat shoe 42 is to insure a smooth finish of the surface being sanded; which provision is necessary because the contacts of the belt under the pulleys 22—25 are rounded and apt to form scalloped cuts. The flat shoe 42 acts to remove any unevenness on the surface of the board B and gives the final finish thereto, as it leaves the machine.

Having thus described my invention, what I claim and desire to secure by Letters Patent is—

1. In a sanding machine, the combination of a slatted feed belt, a continuous abrasive belt disposed above said slatted belt, means for rotating said feed belt and said abrasive belt, and means for moving the lower wing of the abrasive belt at various points throughout its length in and out of contact with a surface carried on said feed belt, and said last named means including a vertically adjustable pulley under which the lower wing of the abrasive belt passes and a vertically adjustable shoe adapted to operate against the lower wing of said abrasive belt.

2. In a sanding machine, the combination of a slatted feed belt, a continuous abrasive belt disposed above said slatted belt, means for rotating said feed belt and said abrasive belt, and means for moving the lower wing of the abrasive belt at various points throughout its length in and out of contact with a surface carried on said feed belt, including an idler pulley under which the lower wing of the abrasive belt passes, means for vertically adjusting said pulley, and a vertically adjustable shoe for bearing the lower wing of the abrasive belt against the work.

3. In a sanding machine, the combination of a slatted feed belt, a continuous abrasive belt disposed above said slatted belt, means for rotating said feed belt and said abrasive belt, means for moving the lower wing of the abrasive belt at various points throughout its length in and out of contact with a surface carried on said feed belt, including an idler pulley under which the lower wing of the abrasive belt passes, and means for vertically adjusting said pulley, a shoe disposed over the lower wing of the abrasive belt adjacent the idler pulley, and means for vertically adjusting said shoe.

4. In a sanding machine, the combination of an endless, slatted, feed belt, a support for the upper wing of said feed belt, means for rotating said feed belt continuously, means for adjusting said feed belt vertically, an endless abrasive belt having its lower wing disposed over the upper wing of said feed belt in alinement therewith, a pair of pulleys around which said abrasive belt passes, means for adjusting one of said pulleys horizontally to tension the abrasive belt, and means for adjusting the other pulley vertically to throw the abrasive belt in and out of contact with a surface carried on said feed belt.

5. In a sanding machine, the combination of an endless, slatted, feed belt, a support for the upper wing of said feed belt, means for rotating said feed belt continuously, means for adjusting said feed belt vertically, an endless abrasive belt having its lower wing disposed over the upper wing of said feed belt in alinement therewith, a pair of pulleys around which said abrasive belt passes, means for adjusting one of said pulleys horizontally to tension the abrasive belt, means for adjusting the other pulley vertically to throw the abrasive belt in and out of contact with a surface carried on said feed belt, and separate means for depressing the lower wing of the abrasive belt toward the feed belt at various points between the pulleys.

6. In a sanding machine, the combination of an endless, slatted, feed belt, a support for the upper wing of said feed belt, means for rotating said feed belt continuously, means for adjusting said feed belt vertically, an endless abrasive belt having its lower wing disposed over the upper wing of said feed belt in alinement therewith, a pair of pulleys around which said abrasive belt passes, means for adjusting one of said pulleys horizontally to tension the abrasive belt, means for adjusting the other pulley vertically to throw the abrasive belt in and out of contact with a surface carried on said feed belt, and separate means for depressing the lower wing of the abrasive belt toward the feed belt at various points between the pulleys, including an idler pulley under which the lower wing of the belt passes, and means for vertically adjusting said idler pulley.

7. In a sanding machine, the combination of an endless, slatted, feed belt, a support for the upper wing of said feed belt, means for rotating said feed belt continuously, means for adjusting said feed belt vertically, an endless abrasive belt having its lower wing disposed over the upper wing of said feed belt in alinement therewith, a pair of pulleys around which said abrasive belt passes, means for adjusting one of said pulleys horizontally to tension the abrasive belt, means for adjusting the other pulley vertically to throw the abrasive belt in and out of contact with a surface carried on said feed belt, separate means for depressing the lower wing of the abrasive belt toward the feed belt at various points between the pulleys, including an idler pulley under which the lower wing of the belt passes and means for vertically adjusting said idler pulley, a shoe disposed over the lower wing of the abrasive belt adjacent the idler pulley, and means for vertically adjusting said shoe.

8. In a sanding machine, an endless abrasive belt, a feed belt disposed below the lower wing of said abrasive belt, means for rotating the upper wing of the feed belt and the lower wing of the abrasive belt in opposite directions, and means for depressing the lower wing of the abrasive belt at various points throughout its length, said last named means including a guide pulley for the abrasive belt, and a vertically adjustable shoe
5 adapted to operate against the lower wing of said abrasive belt.

In testimony whereof I have hereunto set my hand in the presence of two subscribing witnesses.

JOHN W. KROEZE.

Witnesses:
JOHN H. HERRING,
CHARLES EDELMAN.